United States Patent
Miyagi et al.

(10) Patent No.: US 11,866,140 B2
(45) Date of Patent: Jan. 9, 2024

(54) MARINE PROPULSION SYSTEM AND CONTROL METHOD

(71) Applicant: YAMAHA HATSUDOKI KABUSHIKI KAISHA, Iwata (JP)

(72) Inventors: Yuta Miyagi, Shizuoka (JP); Morihiko Nanjo, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 486 days.

(21) Appl. No.: 17/187,919

(22) Filed: Mar. 1, 2021

(65) Prior Publication Data

US 2021/0276686 A1 Sep. 9, 2021

(30) Foreign Application Priority Data

Mar. 3, 2020 (JP) .................................. 2020-036124

(51) Int. Cl.
*B63H 20/00* (2006.01)
*B63H 21/20* (2006.01)
*B63H 21/21* (2006.01)

(52) U.S. Cl.
CPC ............. *B63H 21/20* (2013.01); *B63H 20/00* (2013.01); *B63H 21/21* (2013.01); *B63H 2020/003* (2013.01); *B63H 2021/205* (2013.01); *B63H 2021/216* (2013.01)

(58) Field of Classification Search
CPC ........ B63H 21/20; B63H 20/00; B63H 21/21; B63H 2020/003; B63H 2021/205; B63H 2021/216
See application file for complete search history.

(56) References Cited

U.S. PATENT DOCUMENTS

2017/0349256 A1   12/2017  Nakamura

FOREIGN PATENT DOCUMENTS

| JP | 2014-148273 A | 8/2014 |
| JP | 2017-218016 A | 12/2017 |

*Primary Examiner* — Mathew Franklin Gordon
(74) *Attorney, Agent, or Firm* — Keating & Bennett, LLP (57) ABSTRACT

A marine propulsion system includes marine propulsion devices each including a propeller shaft, an engine, an electric motor, a power transmission to transmit mechanical power to the propeller shaft from at least one of the engine and the electric motor, an electric circuit connected to the electric motor, and a controller to control the engine. The controllers in the marine propulsion devices are communicable with each other when in a communicable state. When the controller in each of the marine propulsion devices is in the communicable state, but the controller of one of the marine propulsion devices is incommunicable with any other controller of the marine propulsion devices, the incommunicable controller limits an output of the engine controlled by the incommunicable controller.

14 Claims, 7 Drawing Sheets

MARINE PROPULSION SYSTEM AND CONTROL METHOD

CROSS REFERENCE TO RELATED APPLICATIONS

This application claims the benefit of priority to Japanese Patent Application No. 2020-036124 filed on Mar. 3, 2020. The entire contents of this application are hereby incorporated herein by reference.

BACKGROUND OF THE INVENTION

1. Field of the Invention

The present invention relates to a marine propulsion system and a control method thereof.

2. Description of the Related Art

There has been conventionally known a type of marine propulsion system including both an engine and an electric motor as mechanical power sources for rotating a propeller shaft of a watercraft (see Japan Laid-open Patent Application Publication No. 2017-218016). The marine propulsion system is configured to rotate the propeller shaft only by a drive force of the electric motor in an extremely low speed range and is also configured to rotate the propeller shaft by a drive force of the engine at a predetermined speed or greater. The electric motor is supplied with electric power from a battery through an electric circuit such as an inverter.

There has also been known a type of watercraft including a plurality of marine propulsion devices as disclosed in Japan Laid-open Patent Application Publication No. 2014-148273.

For example, when three marine propulsion devices, each of which is of the type disclosed in Japan Laid-open Patent Application Publication No. 2017-218016, are mounted to a watercraft, an operator propels the watercraft depending on situations by powering on only two marine propulsion devices located on both starboard and port sides and by powering off the remaining marine propulsion device located in the middle of the two marine propulsion devices. At this time, the following can be assumed in the middle marine propulsion device: induced voltage is generated by an electric motor when entrained rotation of the electric motor occurs through a propeller rotated by driving of the two marine propulsion devices. In the marine propulsion device kept powered off, not only the electric motor but also an electric circuit such as an inverter is not supplied with electric power. Thus, the electric motor and the electric circuit are uncontrolled. As a result, the electric circuit cannot be protected from the induced voltage generated by entrained rotation of the electric motor. Additionally, there is a concern that the electric motor is adversely affected by heat generated due to the induced voltage.

SUMMARY OF THE INVENTION

Preferred embodiments of the present invention protect electric circuits and electric motors from induced voltage generated by entrained rotation of the electric motors in marine propulsion systems each including a plurality of marine propulsion devices.

A marine propulsion system according to a first preferred embodiment of the present invention includes a plurality of marine propulsion devices. Each of the marine propulsion devices includes a propeller shaft, an engine, an electric motor, a power transmission to transmit mechanical power to the propeller shaft from at least one of the engine and the electric motor, an electric circuit connected to the electric motor, and a controller configured or programmed to control the engine. The controllers in the plurality of marine propulsion devices are communicable with each other when in a communicable state. When the controller in each of the plurality of marine propulsion devices is set in the communicable state, but one of the controllers is incommunicable with any other of the controllers, the controller that is being supplied with electric power is configured or programmed to put a limitation on an output of the engine controlled by the controller that is being supplied with electric power.

A marine propulsion system according to a second preferred embodiment of the present invention includes a plurality of marine propulsion devices. Each of the marine propulsion devices includes a propeller shaft, an engine, an electric motor, a power transmission to transmit mechanical power to the propeller shaft from at least one of the engine and the electric motor, an electric circuit connected to the electric motor, and a controller configured or programmed to control the engine. In each of the plurality of marine propulsion devices, the controller is configured or programmed to put a limitation on an output of the engine that is in a driving state when an engine in any other of the plurality of marine propulsion devices is not being driven.

A control method according to a third preferred embodiment of the present invention relates to a method of controlling a marine propulsion system. The marine propulsion system includes a plurality of marine propulsion devices, each including a propeller shaft, an engine, an electric motor, a power transmission to transmit mechanical power to the propeller shaft from at least one of the engine and the electric motor, and an electric circuit connected to the electric motor. The method includes determining whether or not the plurality of marine propulsion devices are in a communicable state with each other, and putting a limitation on an output of the engine that is being supplied with electric power when one of the plurality of marine propulsion devices is incommunicable with any other of the plurality of marine propulsion devices.

According to the marine propulsion systems and control methods in preferred embodiments of the present invention, in each of the plurality of marine propulsion devices, when the controller is set in the communicable state, the controller puts a limitation on the output of the engine that is being supplied with electric power when it is determined that the controller is incommunicable with any other of the controllers. In other words, the output of the engine is limited in each of the plurality of marine propulsion devices when a controller in any other of the plurality of marine propulsion devices is not supplied with electric power.

Accordingly, a watercraft is limited in propulsion speed. Thus, even when entrained rotation of the electric motor is caused while the controller is not supplied with electric power in any of the plurality of marine propulsion devices, an increase in the rotational speed of the electric motor is prevented. As a result, induced voltage generated by the electric motor is prevented. Thus, the electric circuit and the electric motor is protected from the induced voltage generated by entrained rotation of the electric motor in any of the plurality of marine propulsion devices.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
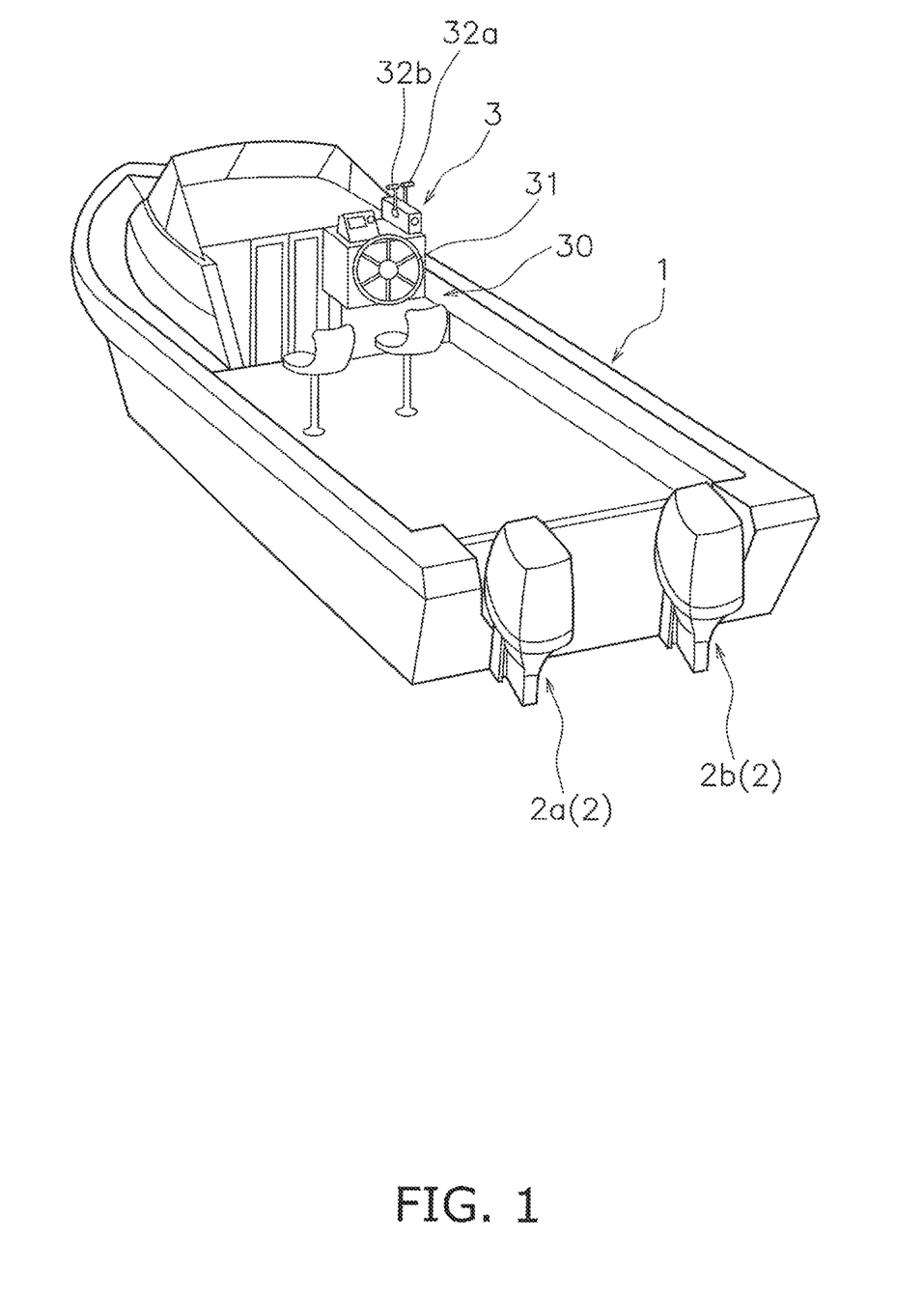
FIG. 1 is a perspective view of a watercraft including a marine propulsion system.
Figure 2:
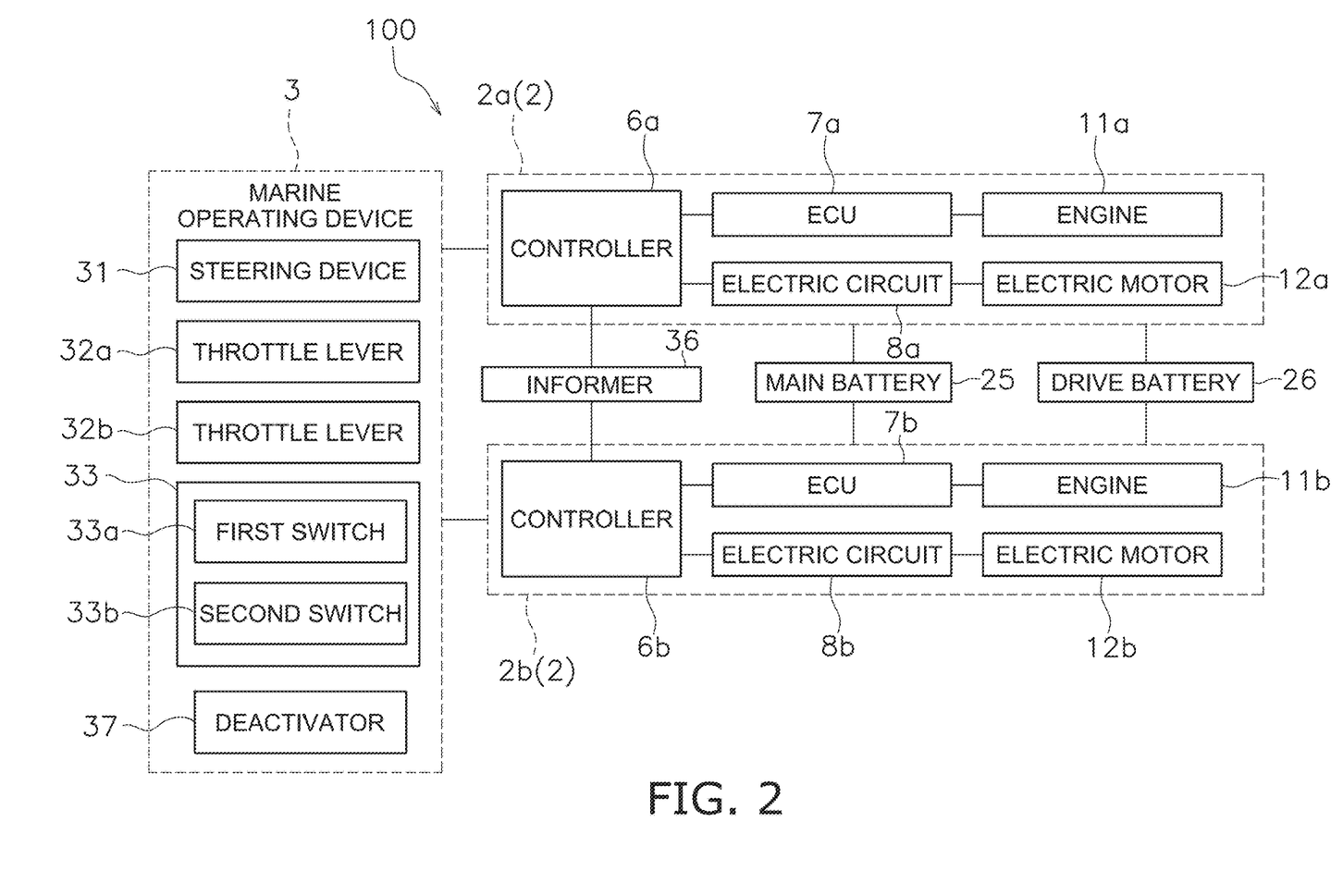
FIG. 2 is a block diagram showing a configuration of the marine propulsion system.

Preferred embodiments will be hereinafter explained with reference to drawings. FIG. 1 is a perspective view of a watercraft 1 including a marine propulsion system 100 according to a first preferred embodiment of the present invention. FIG. 2 is a block diagram showing a configuration of the marine propulsion system 100. The marine propulsion system 100 includes a plurality of outboard motors 2 and a marine operating device 3.

Each outboard motor 2 generates a thrust to propel the watercraft 1. Each outboard motor 2 is an exemplary marine propulsion device. In the present preferred embodiment, the outboard motor 2 attached to a port portion of the stern of the watercraft 1 will be referred to as a first outboard motor 2a, whereas the outboard motor 2 attached to a starboard portion of the stern of the watercraft 1 will be referred to as a second outboard motor 2b.

Figure 3:
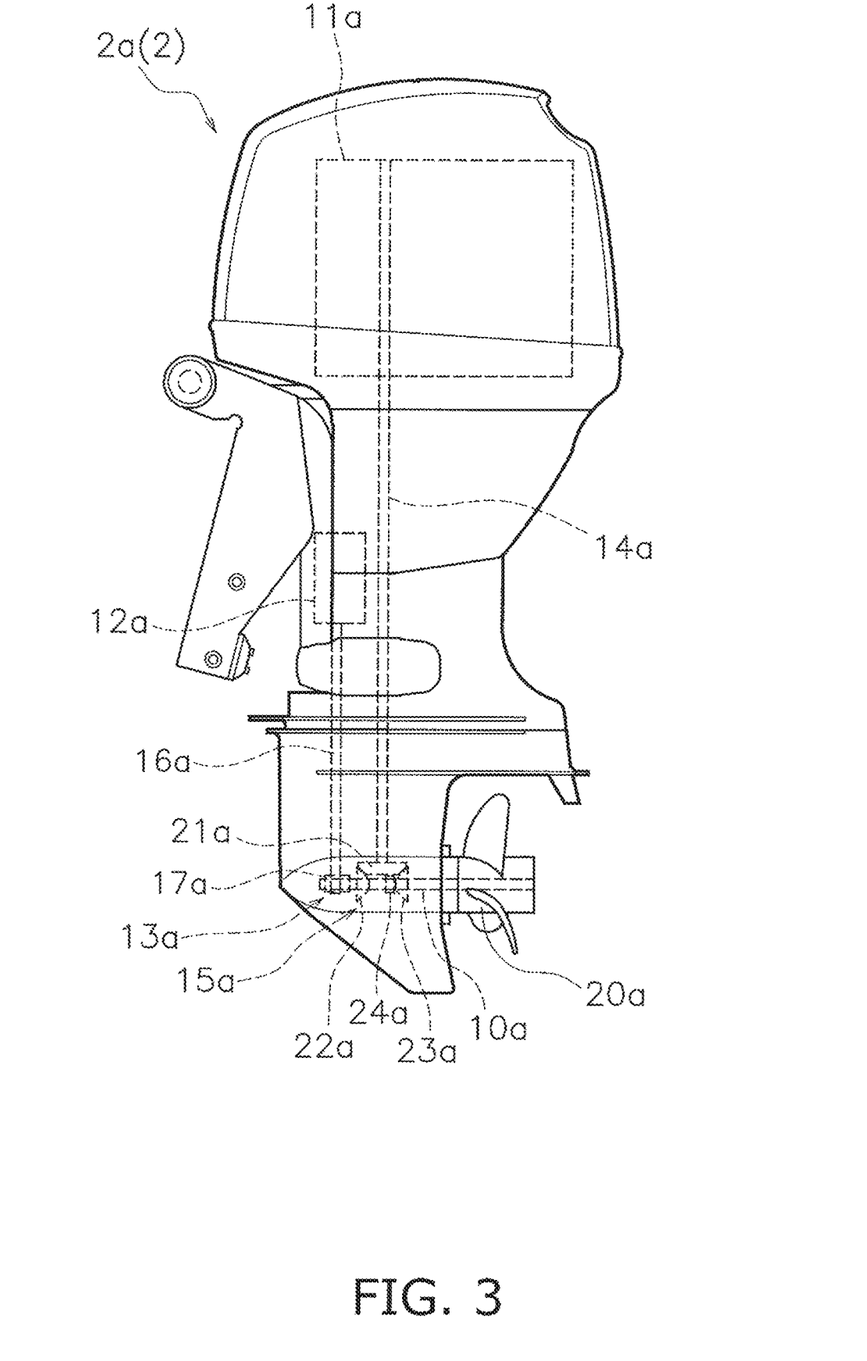
FIG. 3 is a side view of an outboard motor.

FIG. 3 is a side view of the first outboard motor 2a. The first outboard motor 2a includes a propeller shaft 10a, an engine 11a, an electric motor 12a, and a power transmission 13a. It should be noted that the second outboard motor 2b has a similar structure to the first outboard motor 2a.

The propeller shaft 10a extends in the back-and-forth direction of the watercraft 1. A propeller 20a is attached to the propeller shaft 10a and is unitarily rotated therewith. Each of the engine 11a and the electric motor 12a is a mechanical power source that generates the thrust to propel the watercraft 1.

The power transmission 13a transmits mechanical power to the propeller shaft 10a from at least one of the engine 11a and the electric motor 12a. The power transmission 13a includes a drive shaft 14a, an engine clutch 15a, a motor shaft 16a, and a motor clutch 17a.

The drive shaft 14a extends in the vertical direction. The drive shaft 14a is rotated when driven by the engine 11a. The engine clutch 15a connects or disconnects the drive shaft 14a and the propeller shaft 10a to or from each other. Additionally, the engine clutch 15a switches between rotational directions of the propeller shaft 10a.

The engine clutch 15a includes a drive gear 21a, a forward moving gear 22a, a rearward moving gear 23a, and a dog clutch 24a. The drive gear 21a is rotated unitarily with the drive shaft 14a. The forward moving gear 22a and the rearward moving gear 23a are meshed with the drive gear 21a. Rotation of the drive shaft 14a is transmitted to the forward moving gear 22a and the rearward moving gear 23a through the drive gear 21a. The dog clutch 24a is movable to a forward moving position, a neutral position, and a rearward moving position.

When the dog clutch 24a is in the forward moving position, the forward moving gear 22a is connected to the propeller shaft 10a, such that rotation of the drive shaft 14a is transmitted to the propeller shaft 10a through the forward moving gear 22a. When the dog clutch 24a is in the neutral position, the propeller shaft 10a is disconnected from the forward moving gear 22a and the rearward moving gear 23a, such that rotation of the drive shaft 14a is not transmitted to the propeller shaft 10a. When the dog clutch 24a is in the rearward moving position, the rearward moving gear 23a is connected to the propeller shaft 10a, such that rotation of the drive shaft 14a is transmitted to the propeller shaft 10a through the rearward moving gear 23a.

The motor shaft 16a extends parallel or substantially parallel to the drive shaft 14a. The motor shaft 16a is rotated when driven by the electric motor 12a. The motor clutch 17a connects or disconnects the motor shaft 16a and the propeller shaft 10a to or from each other. The motor clutch 17a is movable to a connecting position or a disconnecting position. When the motor clutch 17a is in the connecting position, rotation of the motor shaft 16a is transmitted to the propeller shaft 10a through a motor gear (not shown in the drawings). When the motor clutch 17a is in the disconnecting position, the propeller shaft 10a is disconnected from the motor gear, such that rotation of the motor shaft 16a is not transmitted to the propeller shaft 10a.

As shown in FIG. 2, the first outboard motor 2a includes a controller 6a, an ECU (Electric Control Unit) 7a, and an electric circuit 8a. The controller 6a is configured or programmed to control the first outboard motor 2a. The controller 6a includes a processor such as a CPU (Central Processing Unit) and memories such as a RAM (Random Access Memory) and a ROM (Read Only Memory). The controller 6a stores programs and data to control the first outboard motor 2a.

The controller 6a controls movement of the engine clutch 15a and the motor clutch 17a through actuators (not shown in the drawings) in accordance with an operating signal transmitted thereto from the marine operating device 3. The controller 6a controls driving and output of the engine 11a and/or the electric motor 12a in accordance with the operating signal transmitted thereto from the marine operating device 3. It should be noted that in the present preferred embodiment, the controller 6a controls the engine clutch 15a and the engine 11a through the ECU 7a. The controller 6a may be located inside the first outboard motor 2a, or alternatively, may be located outside the first outboard motor 2a.

The ECU 7a controls the engine clutch 15a and the engine 11a based on a command issued by the controller 6a. For example, the ECU 7a controls the action of the engine clutch 15a and driving and output of the engine 11a in accordance with the command issued by the controller 6a. The ECU 7a includes a processor such as a CPU and memories such as a RAM and a ROM.

The electric circuit 8a is a motor drive circuit and is connected to the electric motor 12a. The electric circuit 8a includes an inverter, for instance, and converts a direct voltage inputted thereto from a drive battery 26 (to be described below) into an alternating voltage and outputs the alternating voltage to the electric motor 12a. The electric circuit 8a also includes a capacitor and a plurality of switching elements. The electric circuit 8a controls the driving and output of the electric motor 12a in accordance with a command issued by the controller 6a.

A main battery 25 and the drive battery 26 to drive the electric motor 12a are connected to the first outboard motor 2a. The main battery 25 and the drive battery 26 are exemplary batteries.

For example, the main battery 25 is a lead battery of 12V and supplies electric power to the first outboard motor 2a. The drive battery 26 is a lead battery of 36V, for example, and supplies electric power to the electric circuit 8a. The drive battery 26 includes, for instance, three lead batteries of 12V connected in series. It should be noted that in the present preferred embodiment, both the main battery 25 and the drive battery 26 are able to supply electric power to the electric circuit 8a.

The first outboard motor 2a is provided with an electric power generator to generate electric power when driven by the engine 11a. The electric power generated by the electric power generator is supplied to the main battery 25 and the drive battery 26. The electric power generator includes, for instance, a rotor and a stator. The electric power generator generates electric power when the rotor connected to the drive shaft 14a is rotated with respect to the stator. It should be noted that the electric power, generated by the electric power generator, is supplied to the drive battery 26, for instance, after being rectified and controlled in voltage by a rectifier voltage regulator and further being increased in voltage to 36V, for example, by a DC/DC converter.

As shown in FIG. 2, similarly to the first outboard motor 2a, the second outboard motor 2b includes a controller 6b, an ECU 7b, an engine 11b, an electric circuit 8b, and an electric motor 12b. The main battery 25 and the drive battery 26 are connected to the second outboard motor 2b. It should be noted that the configuration of the second outboard motor 2b is similar to that of the first outboard motor 2a, and thus, the detailed explanation thereof will be omitted.

The controller 6a of the first outboard motor 2a and the controller 6b of the second outboard motor 2b are connected through wireless communication. The controllers 6a and 6b of the first and second outboard motors 2a and 2b are communicable with each other, while each is supplied with electric power from the main battery 25. It should be noted that the controllers 6a and 6b of the first and second outboard motors 2a and 2b may be connected through wired communication.

The marine operating device 3 is located in a cockpit 30 on the watercraft 1. As shown in FIG. 2, the marine operating device 3 includes a steering device 31, throttle levers 32a and 32b, and a plurality of switches 33. The steering device 31 operates the turning direction of the watercraft 1. The throttle lever 32a regulates a thrust generated by the first outboard motor 2a and switches the direction of the thrust between forward and rearward directions. The throttle lever 32b regulates a thrust generated by the second outboard motor 2b and switches the direction of the thrust between forward and rearward directions.

The plurality of switches 33 include a switch to start each engine 11a, 11b, a switch to set the vessel speed, and a switch to switch each outboard motor 2a, 2b among drive modes. Additionally, the plurality of switches 33 include a first switch 33a and a second switch 33b. The first switch 33a connects or disconnects the main battery 25 and both the electric circuit 8a and the controller 6a to or from each other. The second switch 33b connects or disconnects the main battery 25 and both the electric circuit 8b and the controller 6b to or from each other. For example, the first and second switches 33a and 33b may be rotary switches. The first and second switches 33a and 33b may be located in remote positions from the cockpit 30. The first and second switches 33a and 33b are exemplary switches.

When the first switch 33a is closed and turned to an on state, electric power is supplied to the first outboard motor 2a from the main battery 25 and the drive battery 26. When the first switch 33a is opened and turned to an off state, the main battery 25 and the drive battery 26 are blocked from being connected to the first outboard motor 2a. When the first switch 33a is in the off state, the controller 6a is not supplied with electric power, and thus, is incommunicable with the controller 6b of the second outboard motor 2b.

Likewise, when the second switch 33b is closed and turned to an on state, electric power is supplied to the second outboard motor 2b from the main battery 25 and the drive battery 26. When the second switch 33b is opened and turned to an off state, the main battery 25 and the drive battery 26 are blocked from being connected to the second outboard motor 2b. When the second switch 33b is in the off state, the controller 6b is not supplied with electric power, and thus, is incommunicable with the controller 6a of the first outboard motor 2a.

Figure 4:
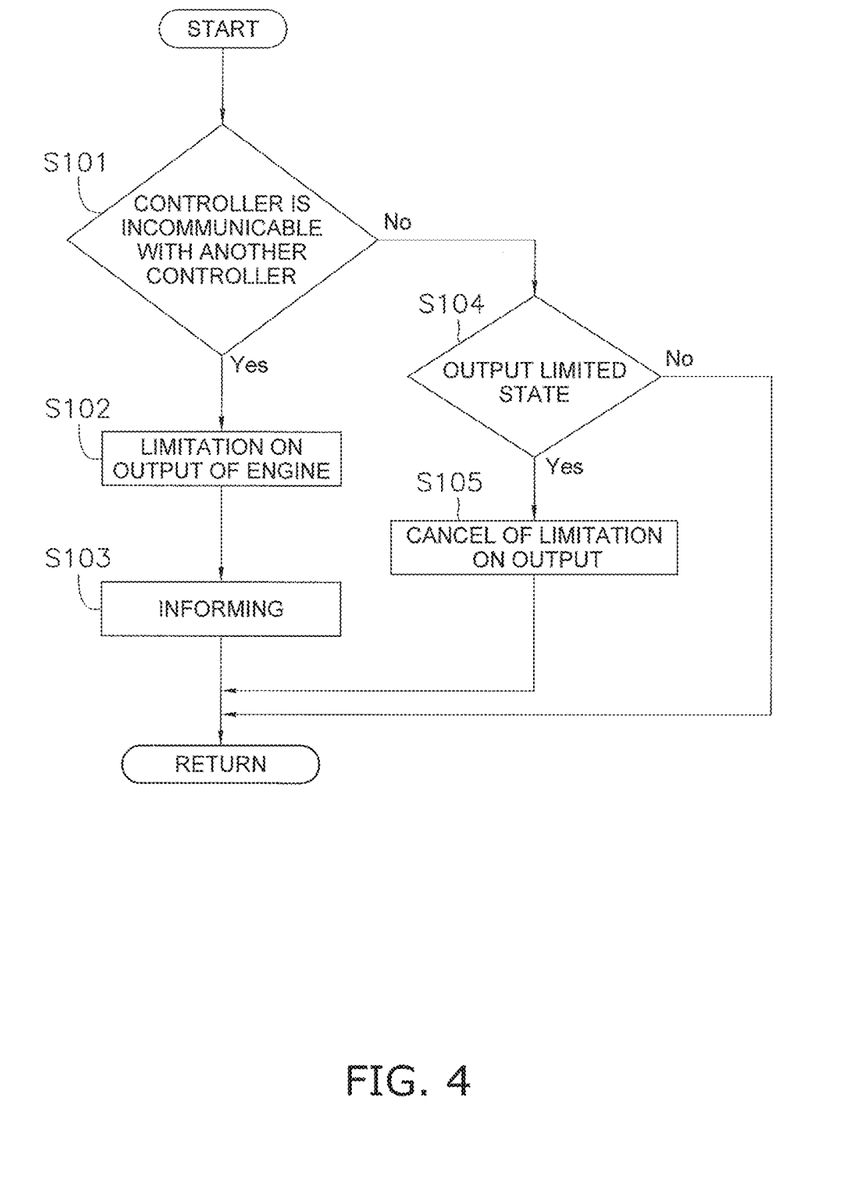
FIG. 4 is a flowchart showing a series of control processes to limit an output of an engine.

Next, a series of control processes to be executed by the controller 6a will be explained with reference to FIG. 4. FIG. 4 is a flowchart showing a series of control processes to limit the output of the engine 11a to be executed by the controller 6a when the controller 6a is supplied with electric power. It should be noted that the controller 6b also executes a series of control processes similar to that executed by the controller 6a.

In step S101, the controller 6a determines whether or not the controller 6a is incommunicable with another controller (herein, the controller 6b). When it is determined that the controller 6a is incommunicable with the controller 6b, the controller 6a executes the process of step S102. In step S102, the controller 6a limits the output of the engine 11a.

Specifically, when the controller 6a is incommunicable with the controller 6b, the controller 6a limits the rotational speed of the propeller 20a by limiting the output of the engine 11a to prevent induced voltage, generated by entrained rotation of the electric motor 12b in the second outboard motor 2b, from exceeding a voltage proof (of, e.g., about 63V) of the capacitor of the electric circuit 8b. The controller 6a limits the output of the engine 11a, for instance, to prevent the rotational speed of the propeller 20a from exceeding about 1500 rpm, for example. Alternatively, the controller 6a limits the output of the engine 11a, for instance, to prevent the rotational speed of the electric motor 12b due to the entrained rotation from exceeding about 4000 rpm, for example.

In step S103, the controller 6a informs a watercraft operator that an output limited state of the engine 11a is activated. In the output limited state, a limitation is put on the output of the engine 11a. As shown in FIG. 2, the marine propulsion system 100 may herein further include an informer 36. The controller 6a informs the watercraft operator that the output limited state of the engine 11a is activated by, for example, sound, light, an indication displayed on a display device, or so forth through the informer 36. Afterward, the controller 6a repeatedly executes the series of processes from step S101.

The informer 36 included in the marine propulsion system 100 enables the watercraft operator to easily notice that the output limited state of the engine 11a is activated. In this case, when it is noticed that the second switch 33b is in the off state by checking the state of the second switch 33b, the watercraft operator is able to deactivate the output limited state of the engine 11a by turning the second switch 33b to the on state.

In step S101, when it is determined that the controller 6a is communicable with the controller 6b, the controller 6a executes the process of step S104.

In step S104, the controller 6a determines whether or not the output limited state of the engine 11a is activated. When it is determined that the output limited state of the engine 11a is activated, the controller 6a executes the process of step S105.

In step S105, the controller 6a cancels the limitation put on the output of the engine 11a. At this time, the controller 6a stops the informer 36 from executing the informing process. Afterward, the controller 6a repeatedly executes the series of processes from step S101.

When it is determined that the output limited state of the engine 11a is not activated in step S104, the controller 6a repeatedly executes the series of processes from step S101.

As shown in FIG. 2, the marine propulsion system 100 may further include a deactivator 37. For example, the deactivator 37 includes a switch. When operated, the deactivator 37 outputs a deactivation signal to deactivate the output limited state of the engine 11a, 11b to the controller 6a, 6b.

Figure 5:
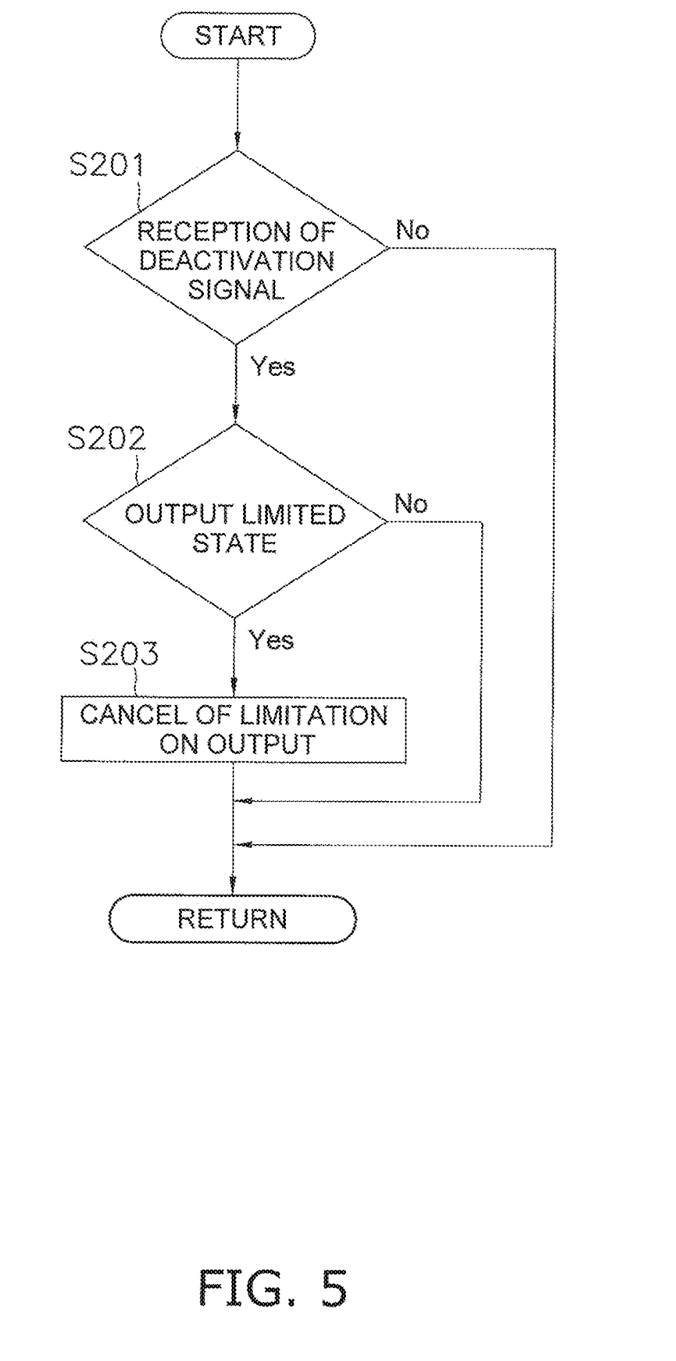
FIG. 5 is a flowchart showing a series of control processes to deactivate an output limited state of the engine.

FIG. 5 is a flowchart exemplifying a series of control processes to deactivate the output limited state of the engine 11a to be executed by the controller 6a. It should be noted that the controller 6b also executes a series of control processes similar to the series of control processes herein executed by the controller 6a.

In step S201, the controller 6a determines whether or not the controller 6a has received the deactivation signal from the deactivator 37. When it is determined that the controller 6a has received the deactivation signal, the controller 6a executes the process of step S202.

In step S202, the controller 6a determines whether or not the output limited state of the engine 11a is activated. When it is determined that the output limited state of the engine 11a is activated, the controller 6a executes the process of step S203.

In step S203, the controller 6a cancels the limitation put on the output of the engine 11a. At this time, the controller 6a stops the informer 36 from executing the informing process. It should be noted that the process of deactivating the output limited state of the engine 11a is not executed when the controller 6a determines that the controller 6a has not received the deactivation signal in step S201 and when the controller 6a determines that the output limited state of the engine 11a is not activated in step S202.

In the marine propulsion system 100 described above, the controller 6a puts a limitation on the output of the engine 11a, for instance, when the controller 6a is incommunicable with the controller 6b and while the controller 6a is being supplied with electric power from the main battery 25. Alternatively, the controller 6b puts a limitation on the output of the engine 11b when the controller 6b is incommunicable with the controller 6a while the controller 6b is being supplied with electric power. When either the controller 6a or the controller 6b is not supplied with electric power, a limitation is put on either the output of the engine 11a or that of the engine 11b. Accordingly, a limitation is put on the propulsion speed of the watercraft 1. Thus, when the controller 6b is not being supplied with electric power, for instance, an increase in the rotational speed of the electric motor 12b due to the entrained rotation is prevented. As a result, the electric circuit 8b and the electric motor 12b are protected from induced voltage generated by entrained rotation of the electric motor 12b.

Incidentally, when the second outboard motor 2b is tilted up, for instance, entrained rotation of the electric motor 12b is not caused. Thus, even when the second switch 33b is kept in the off state, if the marine propulsion system 100 includes the deactivator 37, the output limited state of the engine 11a is deactivated by operating the deactivator 37.

Figure 6:
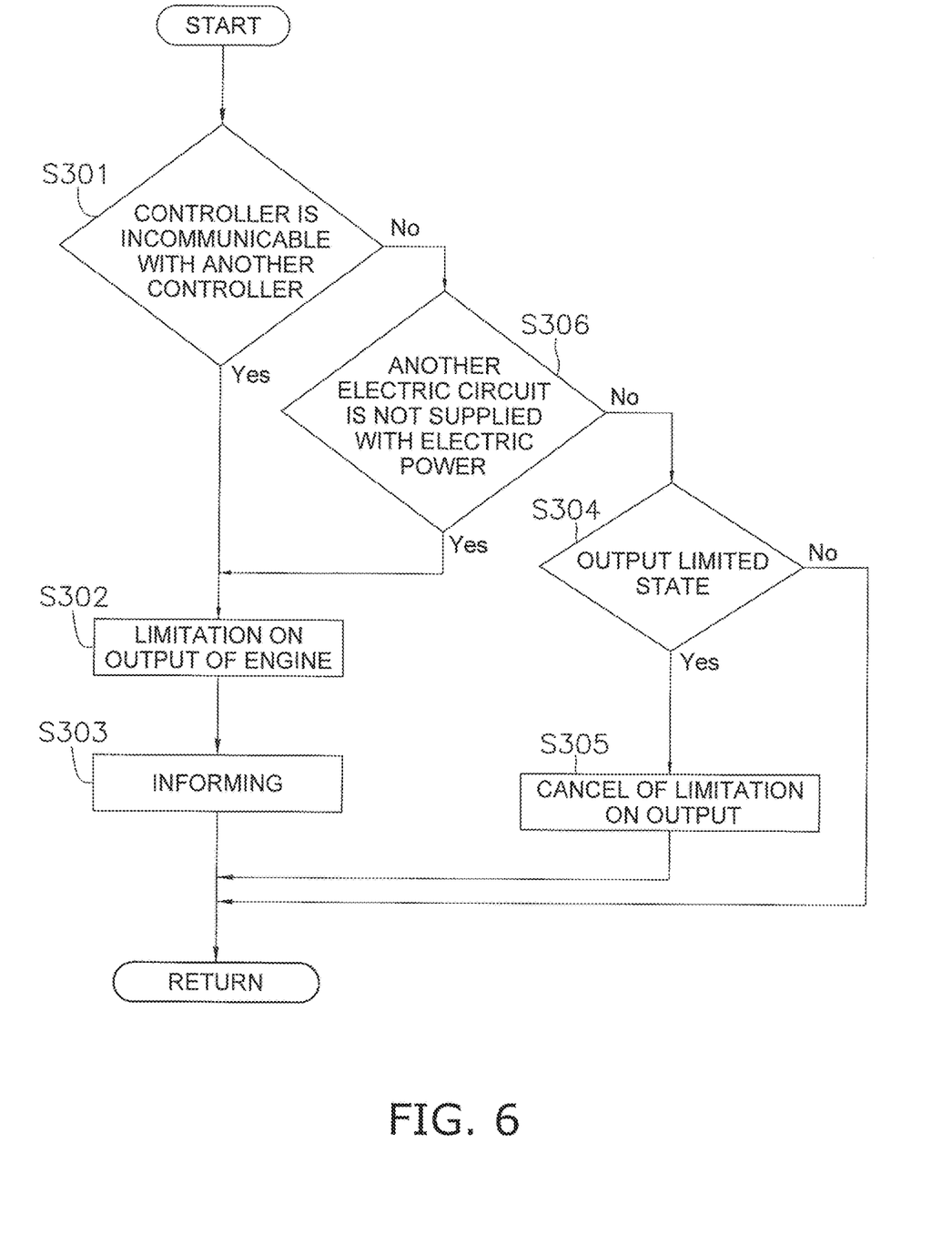
FIG. 6 is a flowchart showing another series of control processes to limit the output of the engine.

FIG. 6 is a flowchart showing a series of control processes to be executed by the controller 6a according to a second preferred embodiment of the present invention. In the second preferred embodiment, the controller 6a limits the output of the engine 11a when it is communicable (No in S301) with another controller (herein, the controller 6b) but another electric circuit (herein, the electric circuit 8b) is not being supplied with electric power (Yes in S306). It should be noted that the series of control processes to be executed by the controller 6a as shown in FIG. 6 is obtained by adding the process of step S306 to that in the first preferred embodiment, and is, except for this, similar to that in the first preferred embodiment. Therefore, the series of processes including steps S301 to S305 is similar to that of steps S101 to S105 shown in FIG. 4, and explanation thereof will be hereinafter omitted.

In step S301, when it is determined that the controller 6a is communicable with the controller 6b, the controller 6a executes the process of step S306. In step S306, the controller 6a obtains information regarding the electric circuit 8b from the controller 6b and determines whether or not the electric circuit 8b is not being supplied with electric power. When it is determined that the electric circuit 8b is not being supplied with electric power, the controller 6a puts a limitation on the output of the engine 11a (step S302). When it is determined that the electric circuit 8b is supplied with electric power, the controller 6a executes the process of step S304.

Figure 7:
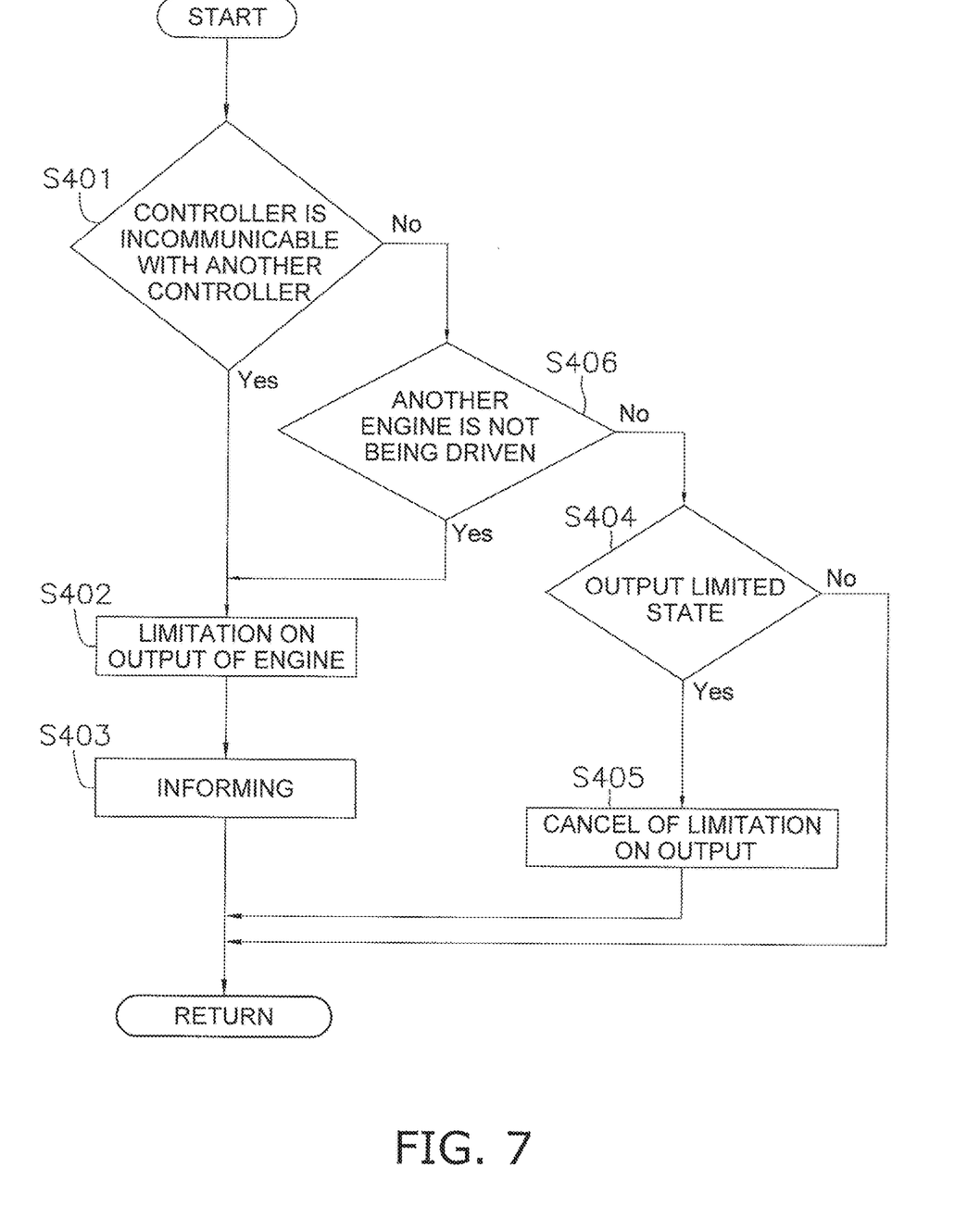
FIG. 7 is a flowchart showing yet another series of control processes to limit the output of the engine.

FIG. 7 is a flowchart showing a series of control processes to be executed by the controller 6a according to a third preferred embodiment of the present invention. In the third preferred embodiment, the controller 6a limits the output of the engine 11a when another engine (herein, the engine 11b) is not being driven. It should be noted that the series of control processes to be executed by the controller 6a as shown in FIG. 7 is obtained by adding the process of step S406 to that in the first preferred embodiment and is, except for this, similar to that in the first preferred embodiment. Therefore, the series of processes of steps S401 to S405 is similar to that of steps S101 to S105 shown in FIG. 4, and explanation thereof will be hereinafter omitted.

In step S401, when it is determined that the controller 6a is communicable with the controller 6b, the controller 6a executes the process of step S406. In step S406, the controller 6a obtains information regarding the engine 1ib from the controller 6b and determines whether or not the engine 1ib is not being driven.

In step S406, when it is determined that the engine 1ib is not being driven, the controller 6a puts a limitation on the output of the engine 11a (S402). It should be noted that, when it is determined that the controller 6a is incommunicable with the controller 6b in step S401, the engine 11b is in an undriven or substantially undriven state in which the controller 6a puts a limitation on the output of the engine 11a.

Preferred embodiments of the present invention have been explained above. However, the present invention is not limited to the preferred embodiments described above, and a variety of changes can be made without departing from the gist of the present invention. For example, the configuration of the outboard motor 2 and/or that of the marine operating device 3 may be changed without being limited to those in the preferred embodiments described above.

In the preferred embodiments described above, the plurality of outboard motors 2 include two outboard motors 2, i.e., the first and second outboard motors 2a and 2b. Alternatively, the plurality of outboard motors 2 may include three or more outboard motors. For example, the plurality of outboard motors 2 may further include another outboard motor 2 (hereinafter referred to as "third outboard motor") located between the first and second outboard motors 2a and 2b. In this configuration, the controller 6a puts a limitation on the output of the engine 11a when it is incommunicable with either the controller 6b or a controller in the third outboard motor. Additionally, the controller 6a cancels the limitation put on the output of the engine 11a when it is communicable with both the controller 6b and the controller in the third outboard motor. It should be noted that each of the controller 6b and the controller in the third outboard motor also executes a series of processes similar to the series of processes executed by the controller 6a. For example, when the controllers 6a and 6b are communicable with each other but only the controller in the third outboard motor is incommunicable therewith, the controller 6a limits the output of the engine 11a while the controller 6b limits the output of the engine 11b.

Similarly in the second and third preferred embodiments of the present invention, the controller 6a puts a limitation on the output of the engine 11a when the controller 6a is incommunicable with either the electric circuit 8b in the second outboard motor 2b or an electric circuit in the third outboard motor, or alternatively, when either the engine 11b in the second outboard motor 2b or an engine in the third outboard motor is not being driven. Contrarily, the controller 6a cancels the limitation put on the output of the engine 11a when transitioning from a condition that the controller 6a is incommunicable with either the electric circuit 8b in the second outboard motor 2b or the electric circuit in the third outboard motor to a condition that both the electric circuit 8b in the second outboard motor 2b and the electric circuit in the third outboard motor are being supplied with electric power. Likewise, the controller 6a cancels the limitation put on the output of the engine 11a when transitioning from a condition that either the engine 11b in the second outboard motor 2b or the engine in the third outboard motor is not being driven to a condition that both the engine 11b in the second outboard motor 2b and the engine in the third outboard motor are being driven.

In the preferred embodiments described above, the main battery 25 is provided to supply electric power to the first and second outboard motors 2a and 2b. Alternatively, batteries may be provided in correspondence to the first and second outboard motors 2a and 2b, respectively. As another alternative, the drive battery 26 does not have to be provided, and the main battery 25 may also function as the drive battery 26.

In the preferred embodiments described above, the power transmission 13a is configured to transmit mechanical power to the propeller shaft 10a from either one of the engine 11a and the electric motor 12a. Alternatively, the power transmission 13a may transmit both mechanical power of the engine 11a and that of the electric motor 12a.

In the series of control processes to be executed by the controller 6a according to the third preferred embodiment, the process of step S401 may be omitted. In this case, the controllers 6a and 6b may not be communicable with each other. For example, the controller 6a may determine that the engine 11b is not being driven based on an operating signal transmitted thereto from the marine operating device 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion system comprising:
   a plurality of marine propulsion devices each including a propeller shaft, an engine, an electric motor, a power transmission, an electric circuit, and a controller, the power transmission to transmit mechanical power to the propeller shaft from at least one of the engine and the electric motor, the electric circuit being connected to the electric motor, and the controller being configured or programmed to control the engine; wherein
   the controllers in the plurality of marine propulsion devices are communicable with each other when in a communicable state; and
   when the controller in each of the plurality of marine propulsion devices is in the communicable state, but one of the controllers is incommunicable with any other of the controllers, the controller that is being supplied with electric power is configured or programmed to put a limitation on an output of the engine controlled by the controller that is being supplied with electric power.

2. The marine propulsion system according to claim 1, wherein the controller that is being supplied with electric power is configured or programmed to cancel the limitation on the output of the engine when the controller that is being supplied with electric power becomes communicable with all others of the controllers.

3. The marine propulsion system according to claim 1, wherein in each of the plurality of marine propulsion devices, the controller puts the limitation on the output of the engine such when the electric circuit in any other of the plurality of marine propulsion devices is not being supplied with electric power.

4. The marine propulsion system according to claim 3, wherein in each of the plurality of marine propulsion devices, the controller cancels the limitation on the output of the engine when transitioning from the electric circuit in the any other of the plurality of marine propulsion devices not being supplied with electric power to the electric circuits in all of the plurality of marine propulsion devices being supplied with electric power.

5. The marine propulsion system according to claim 1, wherein each of the plurality of marine propulsion devices further includes:
   a battery to supply electric power to the electric circuit and the controller; and
   a switch to connect or disconnect the battery and both the electric circuit and the controller to or from each other.

6. The marine propulsion system according to claim 1, further comprising:
   an informer to inform a watercraft operator that an output limited state is being activated by the controller that is incommunicable to put the limitation on the output of the engine controlled by the controller that is incommunicable.

7. The marine propulsion system according to claim 6, further comprising:

a deactivator to output a deactivation signal to the controller that is incommunicable to deactivate the output limited state; wherein the controller that is incommunicable is configured or programmed to deactivate the output limited state upon reception of the deactivation signal from the deactivator.

8. A marine propulsion system comprising:

a plurality of marine propulsion devices each including a propeller shaft, an engine, an electric motor, a power transmission, an electric circuit, and a controller, the power transmission to transmit mechanical power to the propeller shaft from at least one of the engine and the electric motor, the electric circuit being connected to the electric motor, and the controller being configured or programmed to control the engine; wherein in each of the plurality of marine propulsion devices, the controller is configured or programmed to put a limitation on an output of the engine that is in a driving state when an engine in any other of the plurality of marine propulsion devices is not being driven.

9. A method of controlling a marine propulsion system, the marine propulsion system including a plurality of marine propulsion devices each including a propeller shaft, an engine, an electric motor, a power transmission, and an electric circuit, the power transmission to transmit mechanical power to the propeller shaft from at least one of the engine and the electric motor, and the electric circuit being connected to the electric motor, the method comprising:

determining whether or not the plurality of marine propulsion devices are communicable with each other; and putting a limitation on an output of the engine that is being supplied with electric power when one of the plurality of marine propulsion devices is incommunicable with any other of the plurality of marine propulsion devices.

10. The method according to claim 9, further comprising:

removing the limitation on the output of the engine of the plurality of marine propulsion devices that is being supplied with electric power when the one of the plurality of marine propulsion devices that is incommunicable becomes communicable with all others of the plurality of marine propulsion devices.

11. The method according to claim 9, further comprising:

putting the limitation on the output of the engine of the plurality of marine propulsion devices when the electric circuit in any other of the plurality of marine propulsion devices is not supplied with electric power.

12. The method according to claim 11, further comprising:

removing the limitation on the output of the engine of the plurality of marine propulsion devices when the electric circuit in the any other of the plurality of marine propulsion devices that is not being supplied with electric power transitions such that the electric circuits in all of the others of the plurality of marine propulsion devices are supplied with electric power.

13. The method according to claim 9, further comprising:

informing a watercraft operator that an output limited state is being activated to impose the limitation on the output of the engine.

14. The method according to claim 13, further comprising:

outputting a deactivation signal to deactivate the output limited state; and deactivating the output limited state upon receipt of the deactivation signal.

* * * * *